(12) United States Patent
Beckman

(10) Patent No.: US 11,859,573 B2
(45) Date of Patent: Jan. 2, 2024

(54) COMMUNICATION INTERFACE BETWEEN AN EMISSION CONTROL SYSTEM AND INTERNAL COMBUSTION ENGINE

(71) Applicant: Michael Manford Beckman, Ham Lake, MN (US)

(72) Inventor: Michael Manford Beckman, Ham Lake, MN (US)

(73) Assignee: Applied Resonance Technology LLC, Ham Lake, MN (US)

( * ) Notice: Subject to any disclaimer, the term of this patent is extended or adjusted under 35 U.S.C. 154(b) by 144 days.

(21) Appl. No.: 17/454,057

(22) Filed: Nov. 8, 2021

(65) Prior Publication Data

US 2022/0056867 A1 Feb. 24, 2022

Related U.S. Application Data

(63) Continuation of application No. 16/088,029, filed as application No. PCT/US2017/024069 on Mar. 24, 2017, now Pat. No. 11,168,637.

(60) Provisional application No. 62/390,278, filed on Mar. 24, 2016.

(51) Int. Cl.

| F02D 41/00 | (2006.01) |
|---|---|
| F02D 41/14 | (2006.01) |
| F02D 41/28 | (2006.01) |
| F01N 3/025 | (2006.01) |
| F02D 41/02 | (2006.01) |
| F02M 25/12 | (2006.01) |
| F02D 19/06 | (2006.01) |

(Continued)

(52) U.S. Cl.
CPC ......... *F02D 41/02* (2013.01); *F02D 19/0644* (2013.01); *F02D 41/0025* (2013.01); *F02D 41/0027* (2013.01); *F02D 41/1454* (2013.01); *F02D 41/1484* (2013.01); *F02M 25/12* (2013.01); *F02D 41/1486* (2013.01); *F02D 41/266* (2013.01); *F02D 2041/2075* (2013.01); *F02D 2041/281* (2013.01); *Y02T 10/30* (2013.01)

(58) Field of Classification Search
CPC ................ F02D 41/28; F02D 41/1484; F02D 2041/281; F02D 2041/0027; F02D 2041/1454; F02D 2041/2075; F02D 19/0644; Y02T 10/30
See application file for complete search history.

(56) References Cited

U.S. PATENT DOCUMENTS

| 4,411,223 A | * | 10/1983 | Kiely | .................. F02M 21/0206 |
|---|---|---|---|---|
| | | | | 123/3 |
| 4,513,728 A | * | 4/1985 | Ullman | .............. F02M 21/0212 |
| | | | | 123/480 |

(Continued)

*Primary Examiner* — Phutthiwat Wongwian
*Assistant Examiner* — Arnold Castro
(74) *Attorney, Agent, or Firm* — Todd R. Fronek; Larkin Hoffman Daly & Lindgren, Ltd.

(57) ABSTRACT

An interface circuit assembly for use with an electronic control unit and oxygen sensor of an internal combustion engine. The assembly includes an input port coupled to receive a signal from the oxygen sensor and a processing unit coupled with the input port. The processing unit increases the signal to an output voltage as a function of hydrogen being provided to the internal combustion engine. An output port is coupled with the processing unit and provides the output voltage to the electronic control unit.

16 Claims, 4 Drawing Sheets

(51) Int. Cl.
*F02D 41/26* (2006.01)
*F02D 41/20* (2006.01)

(56) References Cited

U.S. PATENT DOCUMENTS

| | | | | |
|---|---|---|---|---|
| 6,226,981 | B1* | 5/2001 | Bruch | F02D 41/1445 60/276 |
| 6,253,751 | B1* | 7/2001 | Carlsson | F02D 19/023 123/527 |
| 6,260,547 | B1* | 7/2001 | Spencer-Smith | F02D 41/1493 123/694 |
| 6,332,434 | B1* | 12/2001 | De Souza | F02M 25/12 123/3 |
| 6,651,623 | B1* | 11/2003 | Tang | B01D 53/9495 123/690 |
| 6,681,749 | B2* | 1/2004 | Bushnell | F02M 17/46 123/549 |
| 7,597,091 | B2* | 10/2009 | Suzuki | F02D 41/1495 123/703 |
| 7,805,236 | B2* | 9/2010 | Mullen | F02D 41/1454 123/694 |
| 8,336,508 | B2* | 12/2012 | Huttner | F02B 43/10 123/3 |
| 8,852,410 | B1* | 10/2014 | Turgeon | C25B 15/02 205/628 |
| 9,506,415 | B2* | 11/2016 | Mullen | F02D 41/1487 |
| 9,771,658 | B2* | 9/2017 | Haring | C25B 9/65 |
| 9,771,859 | B2* | 9/2017 | Haring | F02M 25/12 |
| 11,168,637 | B2* | 11/2021 | Beckman | F02D 41/0027 |
| 2008/0092831 | A1* | 4/2008 | Simon | H01M 16/00 123/3 |
| 2015/0198108 | A1* | 7/2015 | Mullen | F02D 41/1487 701/104 |

* cited by examiner

COMMUNICATION INTERFACE BETWEEN AN EMISSION CONTROL SYSTEM AND INTERNAL COMBUSTION ENGINE

BACKGROUND

Adding hydrogen to gasoline in an internal combustion engine includes: splitting water, producing a hydrogen and oxygen mixture, combining the mixture with ambient air in the intake manifold, injecting fossil fuel into the cylinder, compressing it with a piston, and igniting the mixture. As a result, in current hydrogen systems, there is less hydrocarbon reaction in the exhaust compared with a gasoline-only conventional internal combustion engine. By utilizing hydrogen in combination with an internal combustion engine, emission from fossil fuel ignition can be reduced. However, the reduced hydrocarbon in the exhaust causes an oxygen sensor to send a message to an electronic control unit (ECU) that enriches the gasoline. This enrichment can flood the carburetor and present other undesirable issues.

SUMMARY

An interface circuit assembly for use with an electronic control unit and oxygen sensor of an internal combustion engine. The assembly includes an input port coupled to receive a signal from the oxygen sensor and a processing unit coupled with the input port. The processing unit transforms the signal to an output voltage as a function of hydrogen being provided to the internal combustion engine. An output port is coupled with the processing unit and provides the output voltage to the electronic control unit.

DESCRIPTION

An Emission Control System (ECS) for an automobile is designed to fulfill Environmental Protection Agency (EPA) mandates to reduce harmful emissions. As one function, the ECS protects the automobile by adjusting the air to fuel (e.g., gasoline) ratio in the mixture that is combusted. Current ECS include an oxygen sensor located in an exhaust pipe of the automobile to generate a signal that is sent to an electronic control unit (ECU). In response, the ECU can raise or lower the air to fuel ratio of the mixture.

Figure 1:
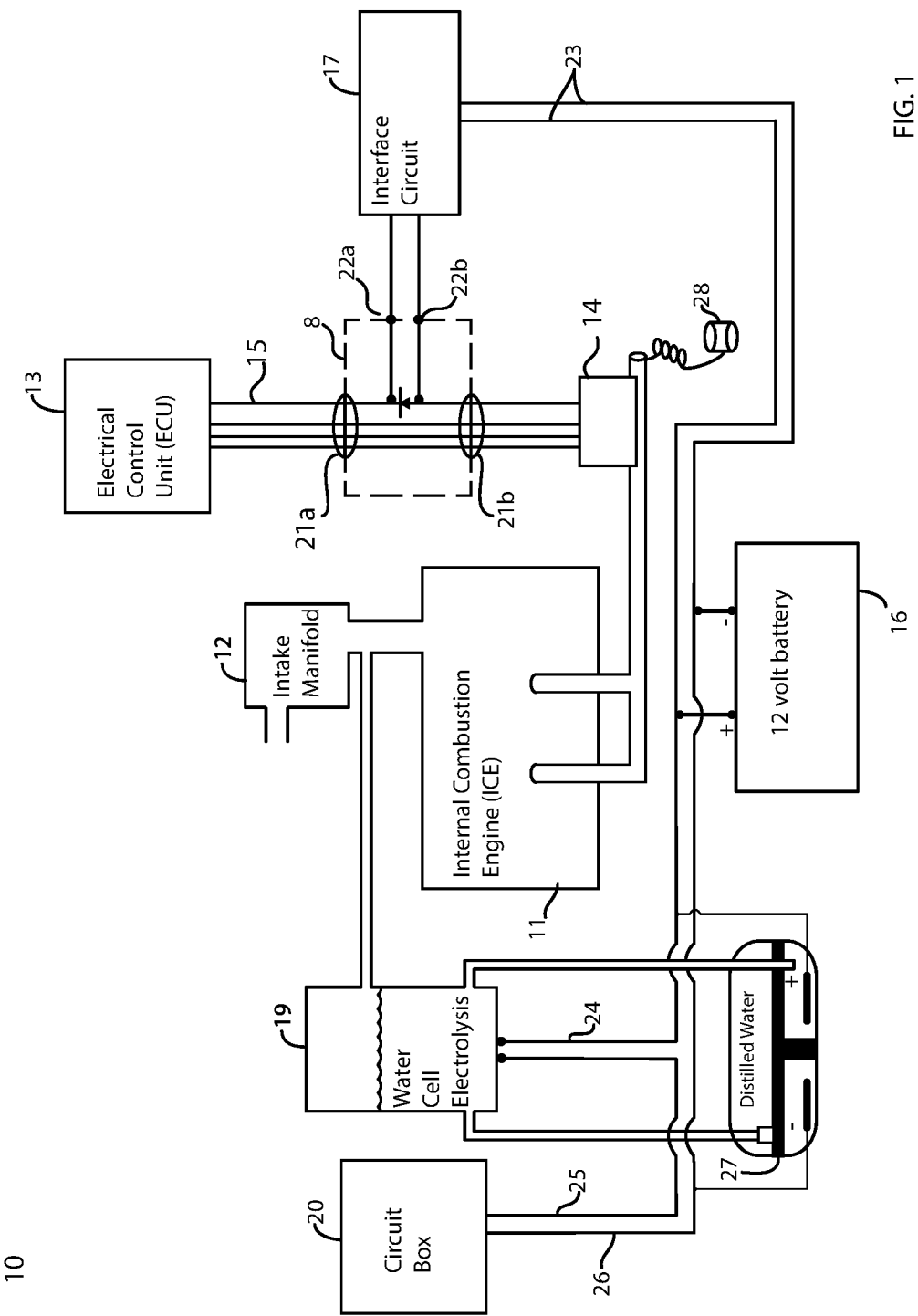
FIG. 1 is a schematic diagram of components of an automobile having an internal combustion engine with an emission control system and a source of hydrogen.

FIG. 1 is a schematic diagram of components of an automobile 10, including an internal combustion engine (ICE) 11 having an intake manifold 12. An electrical control unit (ECU) 13 is operatively coupled with the ICE 11 in order to control air to fuel ratio of the mixture provided to the ICE 11 based on signals from an oxygen sensor 14. The ECU 13 and oxygen sensor 14 are communicatively coupled through a wire harness 15.

A battery 16 is coupled with an interface circuit 17 to transform signals from the oxygen sensor 14 to the ECU when hydrogen is being provided to the ICE 11. The interface circuit 17 is coupled to the wire harness 5 through a connection assembly 8 (e.g., a pair of pigtail connections 21a and 21b) in order to provide modification to signals from the oxygen sensor 14 when an electrolysis cell 19 provides hydrogen to the ICE 11. The interface circuit 17 is connected with an input port 22a and an output port 22b of the interface circuit 17. The water cell 19 can be controlled with a suitable circuit box 20. Wires 23 connect the battery with the interface circuit 17.

A wire 24 connects the battery 16 with the electrolysis water cell 19 and a wire 25 connects the electrolysis cell with the circuit box 20. A further wire 26 connects the circuit box 20 with the battery 16. The water cell 19 contains water that will be converted to hydrogen and oxygen by electrolysis. The water cell 19 further includes a water tank 27 that charges negative ions and regulates the impurity of distilled water that is forced to the electrolysis water cell 19 so as to control amperage.

During operation, power from the battery 16 is provided to the water cell 19, where water within tank 19 is split into hydrogen and oxygen. This mixture is then provided into the intake manifold 12 and mixed with ambient air. The fuel (e.g., gasoline) is also injected into the ambient air-hydrogen mixture in the ICE 11. The ICE 11 ignites the mixture to produce power through combustion. A cooling coil and capture container 28 can be provided to capture water from the exhaust of the ICE 11. Carbon capture from this water and the water can be recycled from container 28.

In a conventional automobile, the oxygen sensor 14 sends a signal to the ECU 13. Dependent upon the signal from the oxygen sensor 14, the ECU 13 will protect various valves and other elements (e.g., a catalytic converter) associated with the ICE 11 by modifying operation of the ICE 11. When hydrogen is further supplied to the intake manifold 12, the oxygen sensor 14 produces a signal indicative of low levels of hydrocarbons in the exhaust of the ICE 11. As a result, the ECU 13 will adjust operation of the ICE 11 to increase enrichment of the fuel. However, this situation is undesirable when using hydrogen as an additive with ICE 11.

When interface circuit 17 is in operation, the circuit 17 adds voltage to the signal from the oxygen sensor 14. The oxygen sensor 14 signal can gate a switch (e.g. a MOSFET) of the interface circuit 17. In particular, the switch creates a hard pulse that is sent to the ECU 13. In response, the ECU 13 determines that hydrocarbons levels are appropriate and does not adjust operation of the ICE 11.

Figure 2:
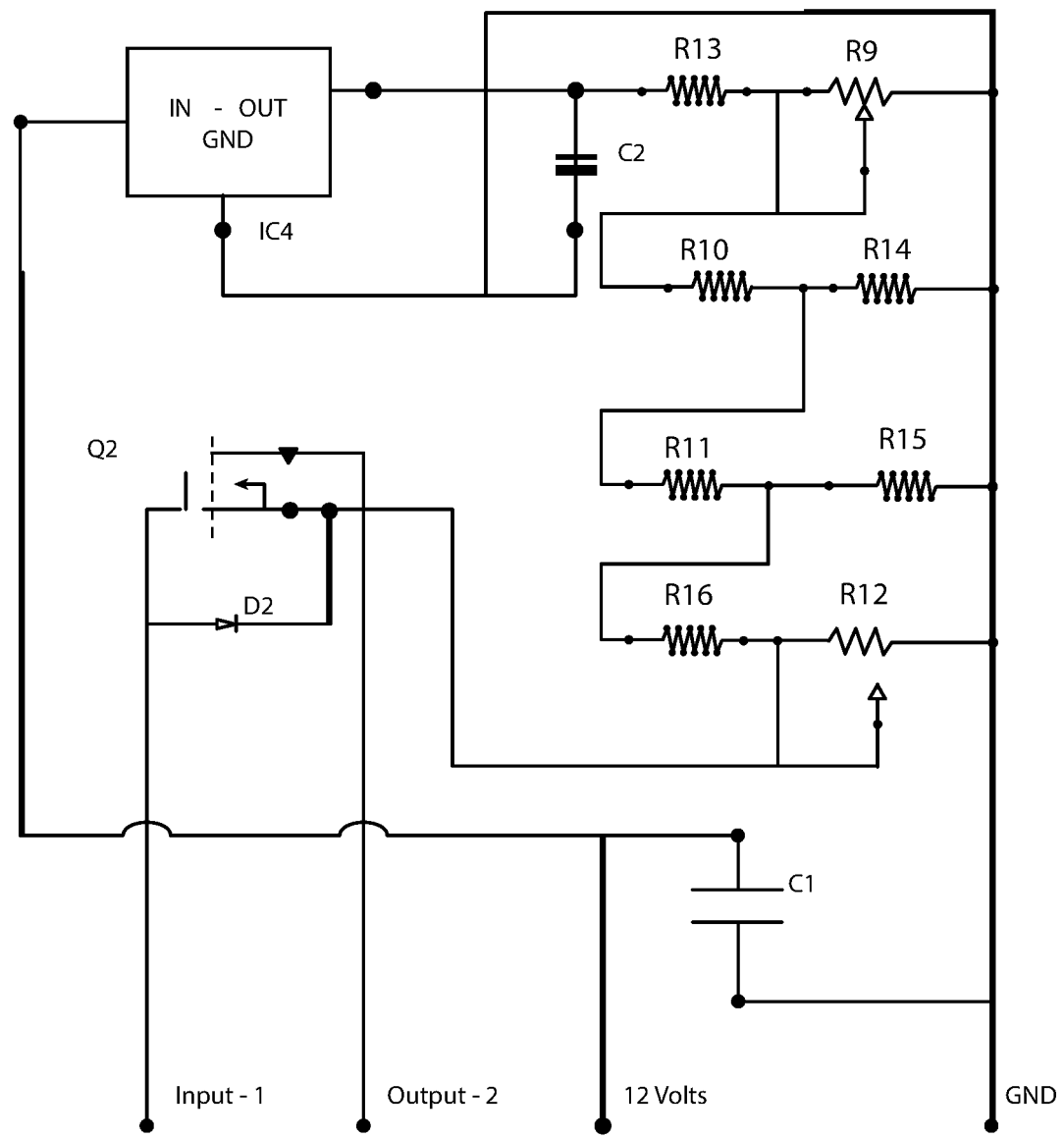
FIG. 2 is a schematic diagram of a circuit.

FIG. 2 schematically illustrates a circuit diagram showing one example circuit layout of circuit 17. Signals from the oxygen sensor are provided to an input port (Input-1) and sent to a switch gate (Q2). In one embodiment, the switch is a gated metal-oxide semiconductor field-effect transistor (MOSFET) that is used to control the added voltage to the signal provided to by the input port. The switch creates an on/off voltage pulse that is sent to an output (output-2). A diode (D2) is used to connect the input (input-1) and the output (output-2) in the direction of the output (output-2). The circuit can be powered from the battery 16 and, in order to achieve a selected voltage, can use a voltage regulator (IC4) one or more capacitors (C1, C2) to stabilize the voltage, one or more resistors (R10-R16) and one or more potentiometers (R9, R12) to step down and adjust the voltage.

Figure 3:
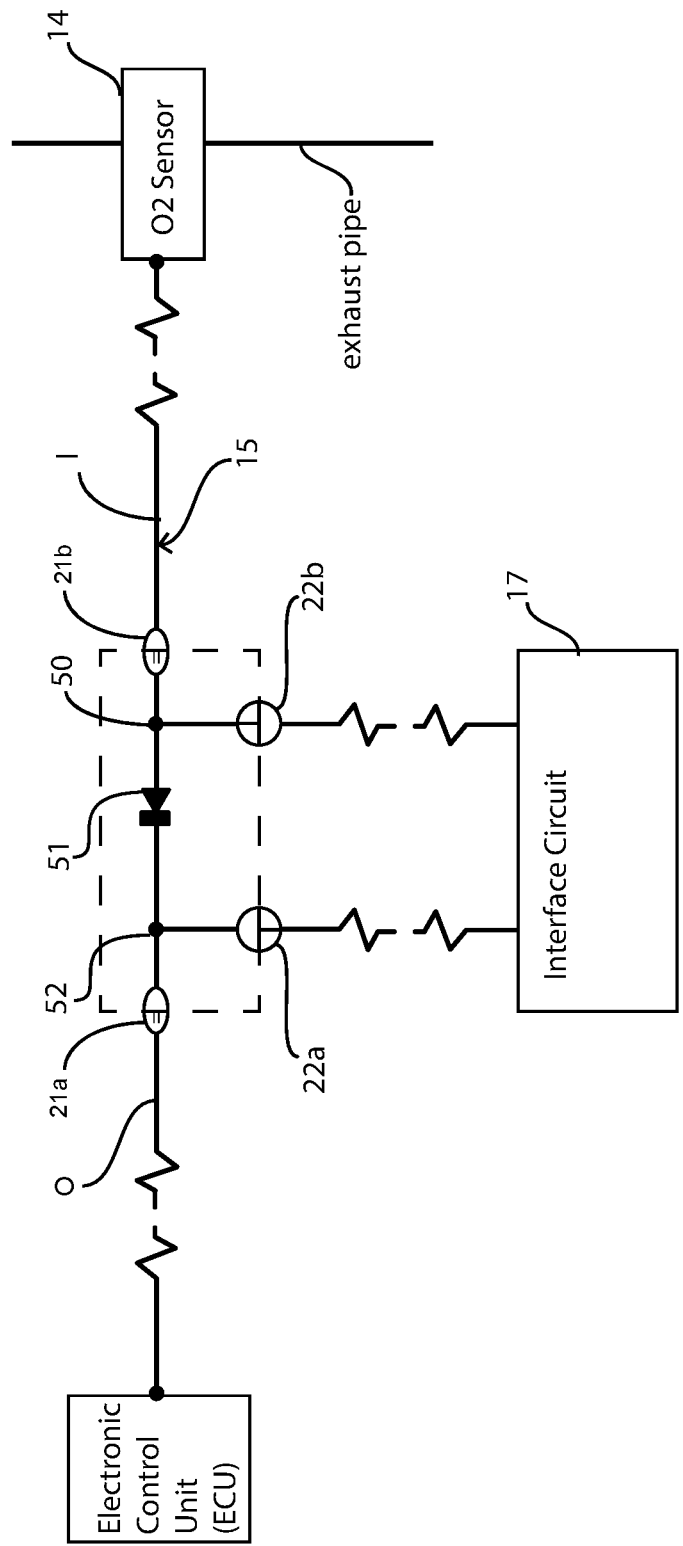
FIG. 3 is a schematic diagram of a cable connection between a circuit and a wire harness to the oxygen sensor and ECU.
Figure 4:
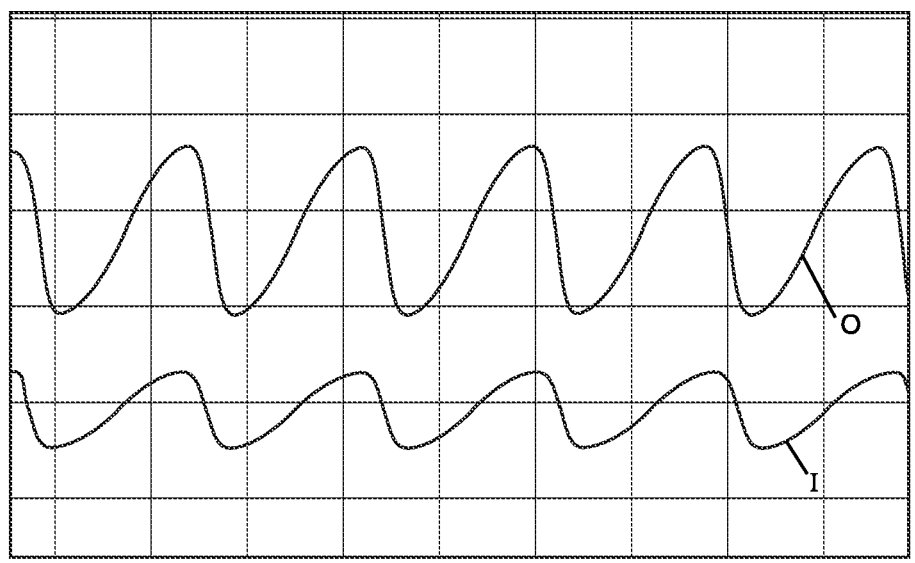
FIG. 4 is a schematic diagram of waveforms showing a difference between an input signal and output signal.

FIG. 3 schematically illustrates a diagram illustrating connection of the circuit 17 into the wire harness 15 connecting the oxygen sensor 14 to the electronic control unit 13. The connector 21a is connected to closest to the ECU 13, whereas the connector 21b is connected closest to the oxygen sensor 14. An input signal (I) travels to connector 21*b* and is sent from a tap 50 through port 22*b* to circuit 17 and to a diode 51. The interface circuit 17 then adds voltage to signal (I). This increased voltage signal (FIG. 2. Output-2) is sent through port 22*a* and a tap 52. An output signal (0) is provided through connector 21*a* and on to the ECU 13. FIG. 4 is an example waveform illustrating a difference between the input signal (I) and the output signal (O).

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A method of operating an interface circuit assembly of an internal combustion engine, comprising:
   receiving an input signal from an oxygen sensor using a first connector;
   using a first diode to direct the input signal to a second connector;
   transforming the input signal to an output voltage by adding voltage to the input signal as a function of hydrogen and gasoline being provided to the internal combustion engine;
   providing a second connector configured to send an output signal to an electronic control unit; and
   directing the output voltage using a second diode to produce the output signal to the electronic control unit that is indicative of the input signal and the output voltage.

2. The method of claim 1, further comprising using a gated metal-oxide semiconductor field emission transistor to control added voltage to the signal.

3. The method of claim 1, wherein the output voltage includes a pulse comprising a selected duration at a selected voltage level.

4. The method of claim 3, wherein the selected voltage level is in a range from approximately 0.08 volts to 0.90 volts.

5. The method of claim 1, wherein connection between the oxygen sensor and the electronic control unit is not bypassed during operation.

6. The method of claim 1, further comprising using a plurality of resistors to transform the input signal.

7. The method of claim 1, further comprising using a plurality of capacitors to transform the input signal.

8. The method of claim 1, further comprising using a plurality of potentiometers to transform the input signal.

9. A method of operating an automobile, comprising:
   providing a mixture of hydrogen and gasoline to an internal combustion engine of the automobile;
   receiving an input signal from an oxygen sensor of the internal combustion engine using a first connector;
   using a first diode to direct the input signal to a second connector;
   transforming the input signal to an output voltage by adding voltage to the input signal as a function of hydrogen and gasoline being provided to the internal combustion engine;
   providing a second connector configured to send an output signal to an electronic control unit; and
   directing the output voltage using a second diode to produce the output signal to the electronic control unit that is indicative of the input signal and the output voltage.

10. The method of claim 9, further comprising using a gated metal-oxide semiconductor field emission transistor to control added voltage to the signal.

11. The method of claim 9, wherein the output voltage includes a pulse comprising a selected duration at a selected voltage level.

12. The method of claim 11, wherein the selected voltage level is in a range from approximately 0.08 volts to 0.90 volts.

13. The method of claim 9, wherein connection between the oxygen sensor and the electronic control unit is not bypassed during operation.

14. The method of claim 9, further comprising using a plurality of resistors to transform the input signal.

15. The method of claim 9, further comprising using a plurality of capacitors to transform the input signal.

16. The method of claim 9, further comprising using a plurality of potentiometers to transform the input signal.

\* \* \* \* \*